(12) United States Patent
Jane Santamaria

(10) Patent No.: US 9,327,752 B2
(45) Date of Patent: May 3, 2016

(54) DEVICE FOR FITTING SEATS AND THE LIKE TO THE CHASSIS OF BABY CARRIAGES

(71) Applicant: JANE, S.A., Palau de Plegamans, Barcelona (ES)

(72) Inventor: Manuel Jane Santamaria, Palau de Plegamans (ES)

(73) Assignee: JANE, S.A., Palau de Plegamans, Barcelona (ES)

( * ) Notice: Subject to any disclaimer, the term of this patent is extended or adjusted under 35 U.S.C. 154(b) by 0 days.

(21) Appl. No.: 14/482,179

(22) Filed: Sep. 10, 2014

(65) Prior Publication Data

US 2015/0084362 A1 Mar. 26, 2015

(30) Foreign Application Priority Data

Sep. 19, 2013 (ES) ................................ 201331078 U

(51) Int. Cl.
*B62B 7/14* (2006.01)
*B62B 3/02* (2006.01)
*B62B 1/00* (2006.01)

(52) U.S. Cl.
CPC . *B62B 7/142* (2013.01); *B62B 1/00* (2013.01); *B62B 3/02* (2013.01); *B62B 7/14* (2013.01)

(58) Field of Classification Search
None
See application file for complete search history.

(56) References Cited

U.S. PATENT DOCUMENTS

| 5,921,574 A * | 7/1999 | Driessen et al. ........... 280/655.1 |
| 2013/0113185 A1* | 5/2013 | Zehfuss ........................ 280/647 |
| 2014/0117647 A1* | 5/2014 | Wang ............................ 280/650 |

FOREIGN PATENT DOCUMENTS

CA    2520926  A1  *   3/2007

\* cited by examiner

*Primary Examiner* — Brodie Follman
*Assistant Examiner* — Hilary L Johns

(57) ABSTRACT

The object of this patent is a device for fitting seats to the chassis of baby carriages. It comprises an anchoring mechanism at each side of the seat for securing the seat in corresponding recipient elements on the chassis of the baby carriage, characterized in that the recipient element is composed of a junction box into which the anchoring mechanism fits. This box rotates around a transverse shaft and has means to limit said rotation. The device can incorporate seats requiring a specific inclination for correct folding.

2 Claims, 2 Drawing Sheets

DEVICE FOR FITTING SEATS AND THE LIKE TO THE CHASSIS OF BABY CARRIAGES

BACKGROUND OF THE INVENTION

1. Field of the Invention

More specifically, this invention describes a device for fitting seats and the like to the chassis of baby carriages, consisting of a recipient element for the anchoring devices on the seat, carrycots and the like on the baby carriage.

2. Description of Related Art

There are several systems for fitting seats, carrycots and the like to the chassis of baby carriages, which enable the element associated to the baby carriage to be changed or vary its position on the chassis or baby carriage.

These fitting systems have recipient elements located on either side of the chassis of the carriage to receive the seat or the like, where the seat has some anchoring means to the box that that constitutes the recipient element.

These recipient elements are secured and bonded to the element of the chassis where they are fitted, to ensure correct and safe adaptation of the seat or the like to the carriage, with the drawback of their use in foldable carriages.

In foldable carriages, the seat has to vary the position of the backrest and the surface of the seat according to how it is folded, and the fitting device if it has a fixed position, varies together with the inclination of said device that is fixed.

In the case of seats that can be attached in either direction on the carriage, known anchoring devices generally incorporate recipients to which the seat is attached, which can vary their position to enable them to fit into the anchoring mechanisms of the seat for attachment in one direction of movement or the other.

BRIEF SUMMARY OF THE INVENTION

The invention aims to provide a securing device that enables the fitting of seats and similar devices, to the chassis of a child's carriage, so that this device in turn allows a limited rotation of the seat with regard to the position where it is installed on the chassis of the carriage to maintain a certain angle when folding the carriage, and therefore maintaining the angle of inclination of the parts of the seat connected to the attachment device.

For this purpose, this attachment device comprises seat anchoring mechanisms, and recipient elements from said anchoring mechanisms. The recipient elements are located on each side of the chassis of the carriage to receive the anchoring mechanisms of the seat, carrycot or similar element, also on each side.

A characteristic of the invention is the fact that the reception elements consist of a junction box that receives the anchoring mechanisms, this box is fitted on the chassis of the carriage on a point of articulation, creating a turning axis, and also has means to limit this rotation.

Rotation is limited by limiting the travel of two stops that go thorough the box with elongated curved slots made in said junction box. Each of these stops is joined respectively to two structural members of the chassis, articulated together, to adjust the rotation of the box with regard to both structural elements.

In this manner, once the carriage is folded and the structural elements of the chassis vary their relative position, following the geometry of their folding, the stops will limit and guide the rotation of the recipient element, maintaining a certain angle and thus being able to incorporate seats or similar devices that need specific inclination for correct folding.

Other details and features will be described in the description below, referring to the two sheets of drawings that accompany this report, in which a practical application of the invention is presented as a non-exclusive example.

DETAILED DESCRIPTION OF THE INVENTION

Figure 1:
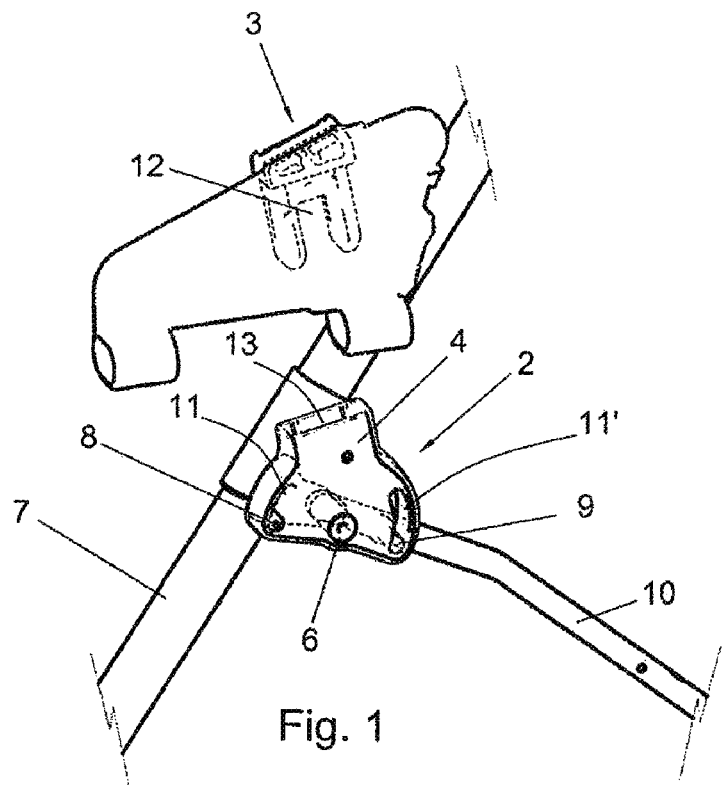
FIG. 1 is a perspective view of the recipient element located on the chassis of the carriage, with the anchoring mechanism prepared for inserting.
Figure 2:
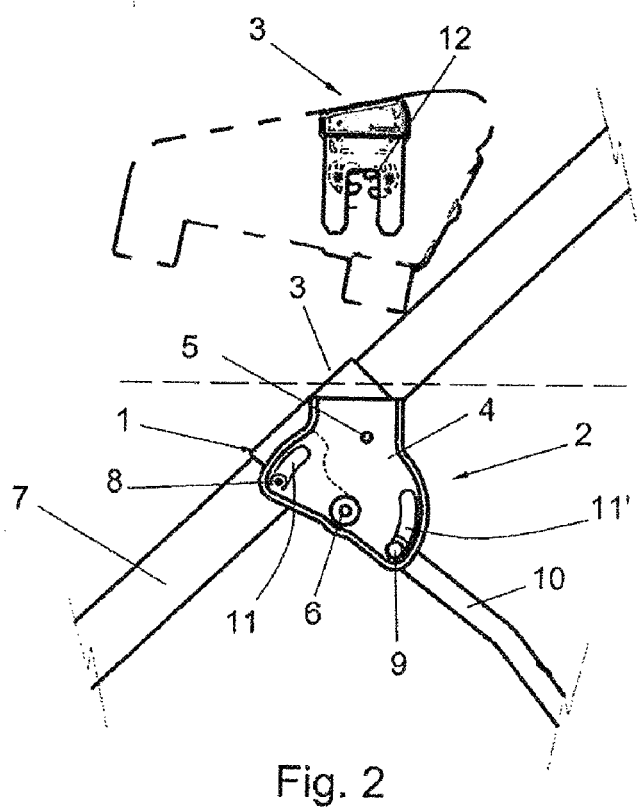
FIG. 2 is a side elevation view of the recipient element located in the chassis of the carriage, with detail of the anchoring mechanism, with the carriage unfolded.
Figure 3:
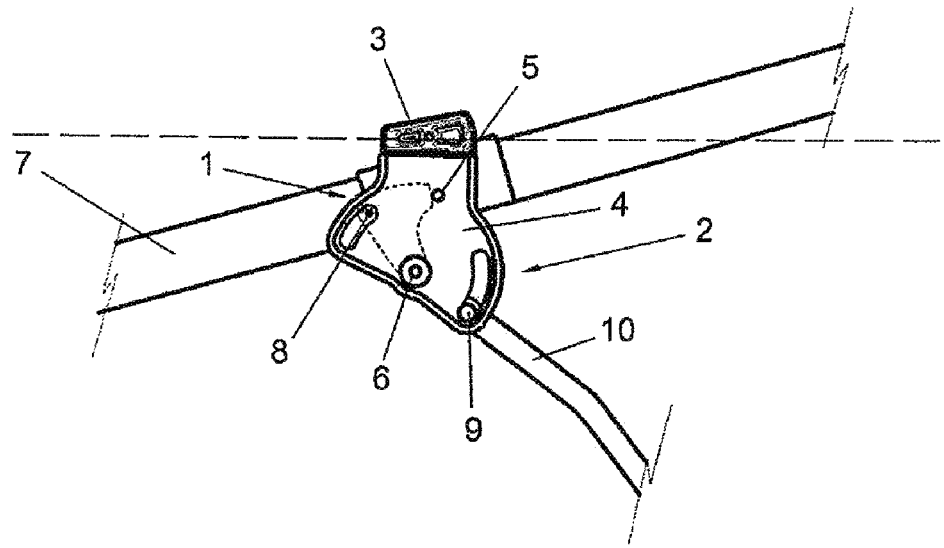
FIG. 3 is a side elevation view of the recipient element located in the chassis of the carriage, with the anchoring mechanism inserted and the carriage in partially folded position.
Figure 4:
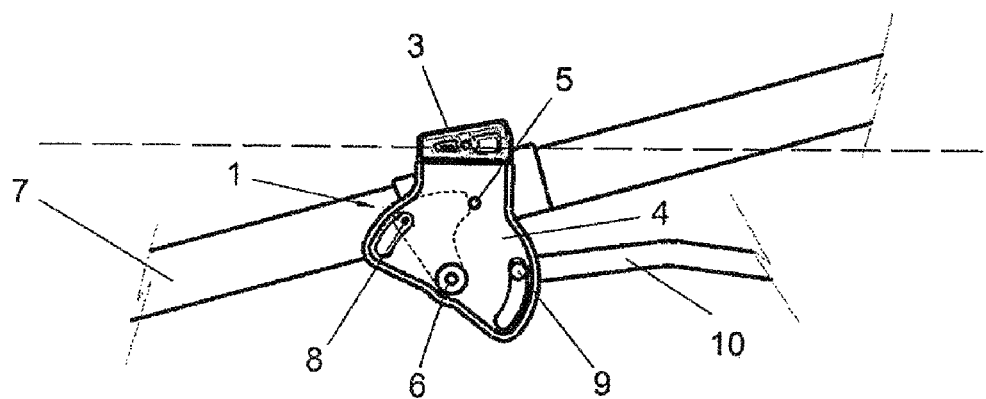
FIG. 4 is a side elevation view of the recipient element located in the chassis of the carriage, with the anchoring mechanism inserted and the carriage in completely folded position.

In this preferred embodiment of the invention, as can be seen in FIGS. 1 to 4, the device for fitting (1) the seats comprises a recipient element (2) located on each side of the chassis of the carriage, to receive the corresponding anchoring mechanisms (3) of the seat to be attached.

Each of the recipient elements (2) is composed of a junction box (4) that has at the top a housing (13) to hold the attachment mechanism (3), as well the cross member (5) they are attached to.

The junction box (4) is fitted on the chassis of the carriage, having three points of contact with it:

A joint axis (6) located on the arm (7) of the handlebar, which allows the junction box (4) to turn with regard to said axis (6), a stop (8) attached to the same arm (7) of the handlebar and that goes through said junction box (4), and a stop (9) attached to the leg (10) of the rear wheel and which also goes through the junction box (4).

The arm (7) of the handlebar and the leg (10) of the rear wheel, are articulated with regard to each other to allow the carriage to be folded.

The junction box (4), in order to allow the relative movement between the arm (7) and leg (10) they are articulated to, has elongated curved slots (11 and 11') that limit the rotation of the junction box (4), so that the end of travel of one of the stops (8 and 9) in its corresponding elliptical groove (11 and 11'), causes the junction box (4) to rotate with regard to the other elliptical groove (11 and 11'), and its corresponding stop (8 and 9), and in this way it remains practically horizontal during folding.

Therefore, once the seat is attached by means of the anchoring of its mechanisms (3) to the recipient element (2), when the carriage begins to be folded the attachment device (1) will maintain a horizontal angle during the entire folding process, allowing the seat to be correctly folded, as it needs this position for correct folding.

These anchoring mechanisms (3) are of the "Isofix" type, which comprise two symmetrical anchoring devices (12) to adapt to each of the positions of the seat, either attached in one direction or the other, as the junction box (4) has a single element (5) they attach to and having a different anchoring position according to the fitting direction.

Having sufficiently described this invention, with correspondence to the attached drawings, it is easy to understand that any sort of modification deemed necessary can be introduced as long as they do not change the essence of the invention, which is summarised in the following claims:

The invention claimed is:

1. A device for fitting seats to the chassis of baby carriages comprising an anchoring mechanism at each side of a seat for securing the seat in corresponding recipient elements on the chassis of the baby carriage, being constituted the recipient elements provided in the chassis by a junction box where the anchoring mechanism fits, the junction box rotates around the joint axis comprises means to limit said rotation, the means consisting of two opposing curved slots gone through stops wherein the anchoring means comprises two symmetrical anchoring devices to adapt to each of the positions of the seat either attached in one direction or the other, as the junction box has a single element they attach to and having a different anchoring position according to the fitting direction, of which a stop is attached to the arm of the handlebar of the carriage and the other one to the leg of the rear wheel.

2. A device for fitting seats to the chassis of baby carriages comprising:
   an anchoring mechanism on each side of a seat comprising two symmetrical anchoring devices;
   a corresponding recipient element secured by a junction box to each side of a chassis of a baby carriage;
   each junction box comprising a top housing which receives the corresponding anchoring mechanism, a single element which attaches to the two symmetrical anchoring devices of the anchoring mechanism in various anchoring positions, and two elongated curved slots comprising elliptical grooves;
   each junction box is rotatably connected to a joint axis on an arm of a handlebar of the baby carriage;
   a stop passes through each of the two elongated curved slots of the junction box wherein one of the stops is attached to the arm of the handlebar of the baby carriage and the second stop is attached to a leg of a rear wheel of the baby carriage;
   wherein the rotation of the junction box around the joint axis permits the folding of the baby carriage between the arm and the leg; and
   wherein the rotation of the junction box around the joint axis is limited by the stops within the elongated curved slots so that the end of travel of one of the stops within the corresponding elliptical groove of the elongated curved slot causes the junction box to rotate with regard to the other elliptical groove and its corresponding slot to maintain the horizontal angle during the entire folding process and allowing the seat to be correctly folded.

* * * * *